May 8, 1945.  G. T. DOWNEY  2,375,633
CYLINDRICAL VALVE ASSEMBLY
Filed Oct. 5, 1943  3 Sheets-Sheet 2

Inventor
G. T. Downey
By Kimmel & Crowell
Attorneys

May 8, 1945.　　　G. T. DOWNEY　　　2,375,633
CYLINDRICAL VALVE ASSEMBLY
Filed Oct. 5, 1943　　　3 Sheets-Sheet 3

Inventor
G. T. Downey
By Kimmel & Crowell
Attorneys

Patented May 8, 1945

2,375,633

UNITED STATES PATENT OFFICE 2,375,633

CYLINDRICAL VALVE ASSEMBLY

George T. Downey, Corry, Pa., assignor to Aero Supply Mfg. Co. Inc., Corry, Pa.

Application October 5, 1943, Serial No. 505,060

2 Claims. (Cl. 251—113)

This invention relates to multi-port valve assemblies, and more particularly to an improved seal for the rotary plug.

An object of this invention is to provide an improved valve plug and seat assembly which will permit the construction of the complete valve structure with a minimum of grinding or lapping.

Another object of this invention is to provide a spring-pressed seat for the rotary plug about each one of the plurality of ports so that the plug will be adequately sealed within the housing, and so that in the event of leakage through one port, a new seat may be inserted without taking the entire valve structure apart and without re-grinding the plug or correlated parts.

A further object of this invention is to provide a renewable valve seat which includes a metal shell slidable in the valve port and a ring-shaped resilient sealing element secured to the inner end of the shell for contact with the periphery of a rotary valve plug.

A further object of this invention is to provide a valve structure which will permit speeding up of construction of the parts making up the structure, and will permit final assembly of the parts on an assembly line, the parts being so constructed that close tolerances are avoided and at the same time the assembly will be leakproof for gasoline or other fluids.

With the foregoing objects in view, and others which may hereinafter more fully appear, the invention consists of the novel construction, combination and arrangement of parts, as will be more specifically described, and illustrated in the accompanying drawings wherein are shown embodiments of the invention, but it is to be understood that changes, variations and modifications may be resorted to which fall within the scope of the invention as claimed.

In the drawings:

Figure 4 is a fragmentary sectional view taken on the line 4—4 of Figure 1; and

Figure 5 is an enlarged fragmentary sectional view of the valve structure.

Figure 1:
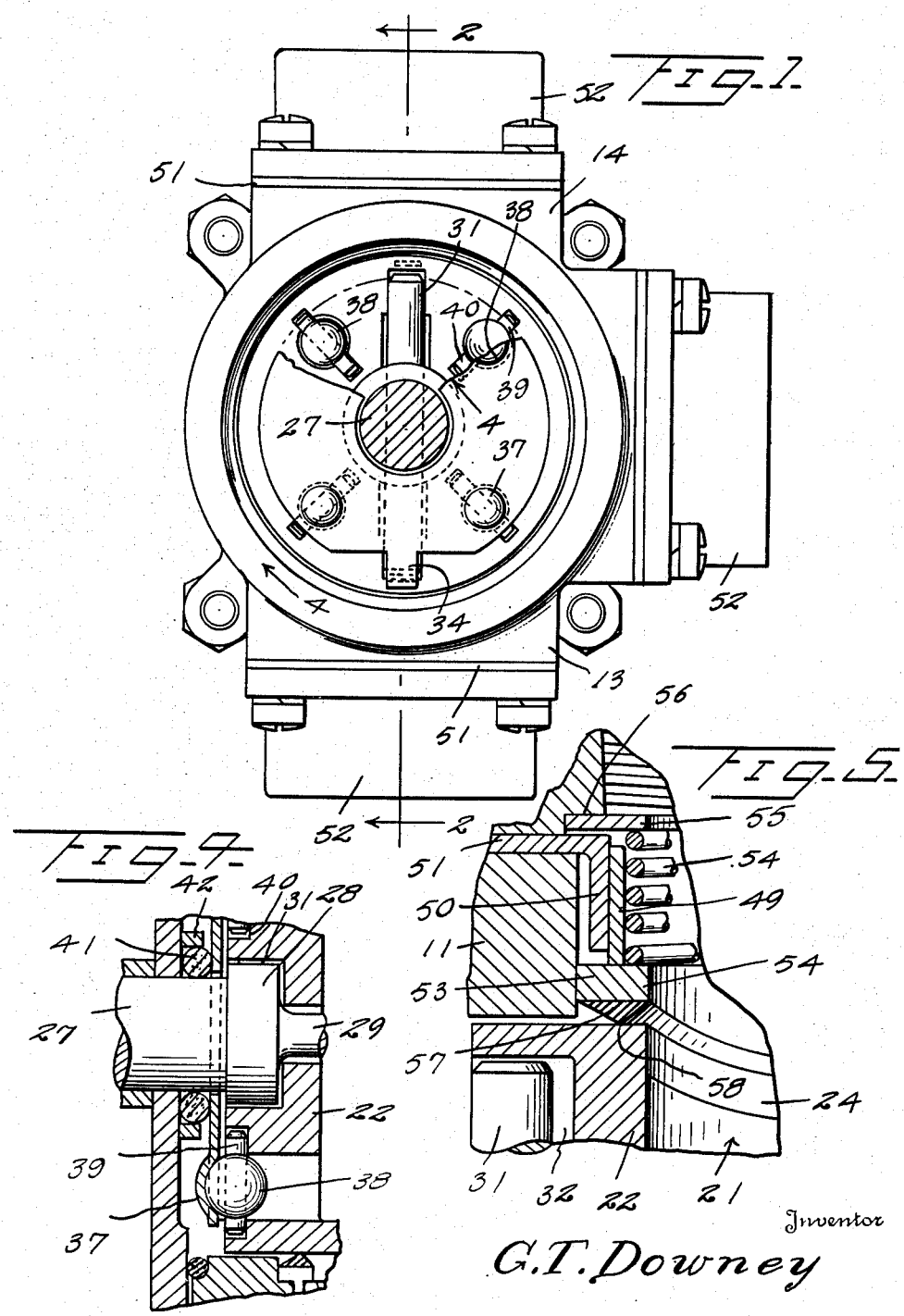
Figure 1 is a detail side elevation, partly broken away, of a valve structure constructed according to an embodiment of this invention, one head or end of the valve being removed.

Referring to the drawings the numeral 10 designates generally a valve housing which is formed of a body 11 having an outlet boss or bushing 12, and a plurality of radially arranged inlet bosses or bushings 13 and 14. A head or plate 14a is secured to one side of the body 11, by fastening members 15 and an opposed head 16 is secured to the opposite side of the body 11, by fastening members 17. In the present instance the head 16 includes a bushing 18 which is interiorly threaded as at 19 whereby an outlet pipe may be connected with the bushing 18.

The body 11, is of hollow construction and is formed with a circular bore 20 within which a cylindrical rotary valve plug 21 is adapted to be loosely and rotatably mounted. The valve plug 21 includes an end wall 22 having formed integral therewith a cylindrical side wall 23 which opens in the direction of the outlet boss 12. The side wall 23 is provided with a single inlet port or opening 24 so that the interior of the plug 23 may be selectively placed in communication with a selected one of the several inlet ports. The boss or bushing 13 is provided with an inlet port 25 and the boss 14 is provided with an inlet port 26. The valve plug 21 is mounted on an operating shaft 27 which is rotatably disposed through the head 14a.

The shaft 27 is formed with an enlarged annular flange 28 at the inner end thereof, and a reduced stub shaft 29 extends inwardly to the flanged inner end 28, being loosely disposed through a central opening 30 formed in the head or end wall 22. The plug 21 is held against rotation with respect to the shaft 27 by means of a pin 31 which extends through the shaft 27 and is seated in diametrically opposed recesses 32 which are formed in the outer side of the end wall 22 of the plug 21. The plug 21 is held in a sealed position with the intake port 24 thereof in registry with a selected one of the several intake ports by means of an index structure which includes an annular plate 33 interposed between the outer side of the wall 22 and the inner side of the head 14a. The plate 23 is provided with a pair of diametrically opposed tongues 34 having out-turned ends 35 which engage in recesses 36 formed in the inner side of the head 14a. The plate 33 is formed with a plurality of radially arranged detents 37 having the concave side thereof innermost and balls 38, which are rotatable with the plug 21, are adapted to engage in the concave inner sides of the detents 37. Each ball 38 is mounted on a pin or shaft 39 which is longer than the diameter of the ball and which has the opposite ends thereof loosely seated in recesses 40 formed in the head 22.

Figure 2:
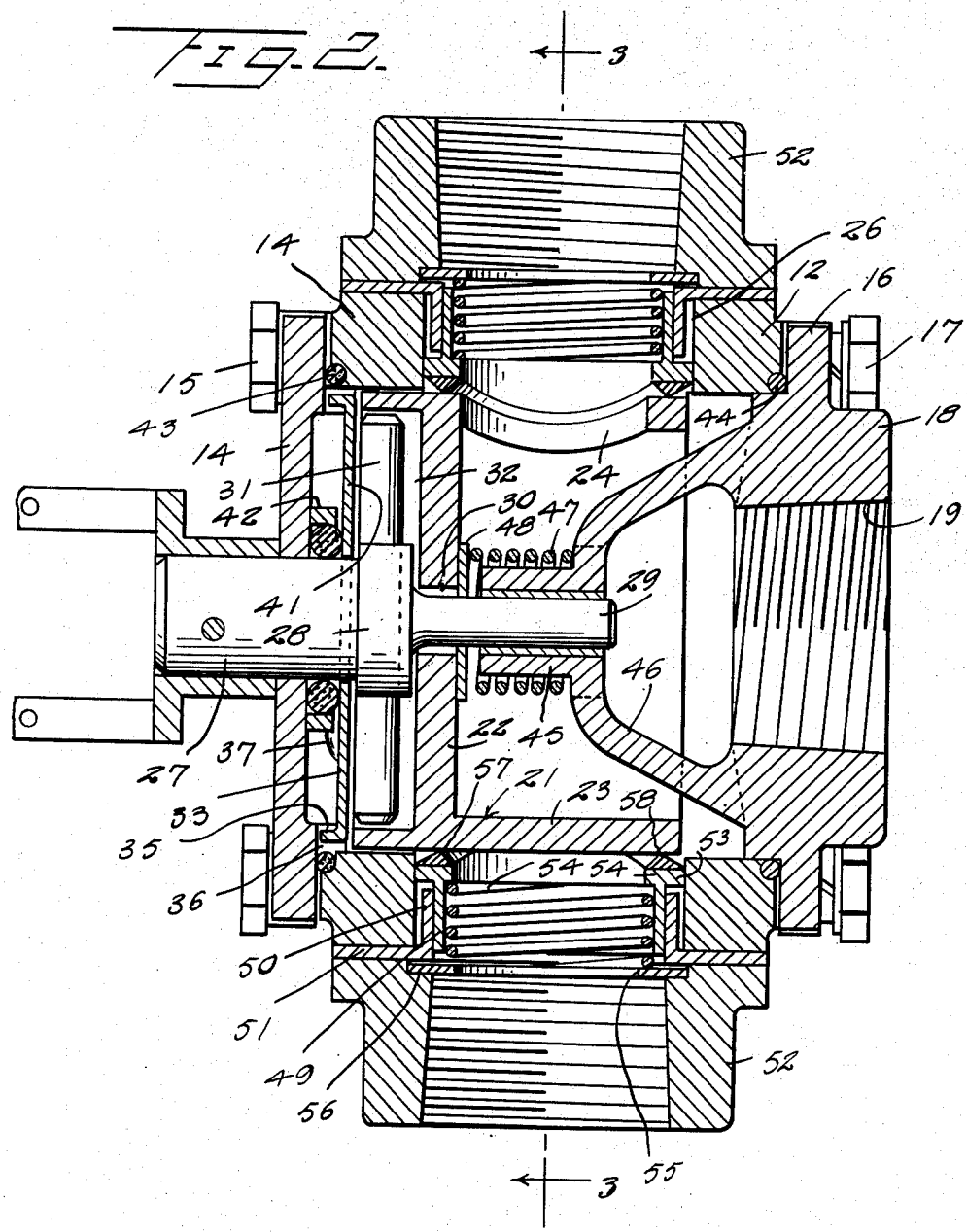
Figure 2 is a sectional view taken on the line 2—2 of Figure 1.
Figure 3:
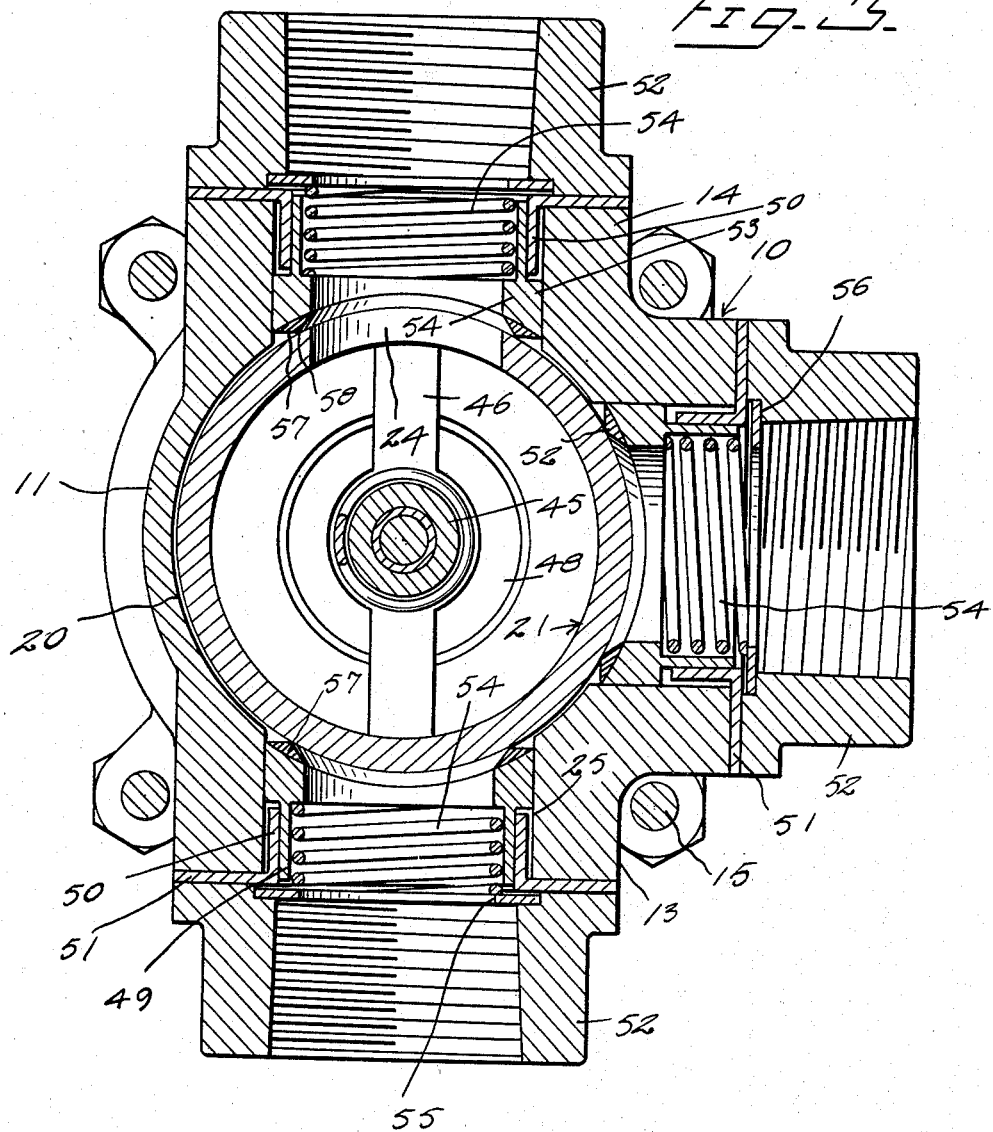
Figure 3 is a sectional view taken on the line 3—3 of Figure 2.

A resilient sealing ring 41 is disposed about the shaft 27 on the inner side of the head 14a and is mounted within a metal retainer 42, as shown in Figure 2. A sealing ring 43 is interposed between the head 14a and the body 11, and a sealing ring 44 is interposed between the body 11 and the head 16.

The stub shaft 29 is rotatably mounted in a bearing sleeve 45 which is carried by a pair of inwardly convergent arms 46 fixed to or formed integral with the head 16. A spring 47 is disposed about the bearing 45 and bears at one end against the adjacent end of the bearing 45 where it joins with the arms 46 and at the opposite end bears against a washer 48 mounted on the stub shaft 29 on the inner side of the head 22. The spring 47 constantly urges the valve plug 21 to the left or in the direction of the head 14a and compresses the sealing member 21 in order to provide a resilient means for holding resiliently the balls 38 in the detent 37.

The plug 21 is adapted to be sealed with respect to the inlet ports by means of a combined valve seat and seal which includes a cylindrical body 49 loosely disposed in an inlet port. The body 49 is slidable within an annular flange 50 carried by a sealing gasket 51 which is interposed between the outer end of an inlet bushing and a connector bushing 52 which is secured to the housing 11 at the outer end of the inlet port. The cylindrical body 50, at its inner end, is formed with an outwardly extending annular flange 53 and is also formed with an inwardly extending annular flange 54. The periphery of the outer flange 53 slidingly engages the inlet port, whereas the inner flange 48 provides a seat against which the inner end of a spring 54 is adapted to engage. The outer end of the spring 54, which constantly urges the valve seat structure inwardly, bears against a ring 55 which is mounted in an annular rabbet 56 formed in the inner end of the connector 52.

A ring-shaped resilient sealing member 57 is fixed to the inner sides of the two flanges 53 and 54, the sealing member 57 being substantially triangular in transverse section and concave at its inner side in side elevation so that the peak 58 of the sealing member will sealingly contact with the periphery of the cylindrical plug body 23. The sealing member 58, which also forms a valve seat, may be constructed of rubber, either natural or synthetic, or of rubber compositions, and is vulcanized or otherwise firmly attached to the inner end of the combined seat and seal. The provision of the resilient seat and seal 57, which is secured to the inner end of the body 49, provides a removable cage and seat so that it will not be necessary to grind the plug 23 to the valve seat. In other words the spring 54 will yieldingly hold the seal 57 against the outer side of the plug 21 and the latter may have the periphery thereof ground or otherwise smoothed so that the resilient seal 57 will provide a fluidtight joint.

With a construction as hereinbefore described, it is not necessary to grind or lap the plug 23 in the bore 20 of the housing body 11, and each valve seat can be constructed as a separate unit for insertion within the valve port thereby permitting the construction of the entire assembly in units and their final assembly may be quickly put together in such a manner that a fluidtight seal will be provided between the rotary valve plug and the several ports.

The provision of the yieldable seal on the inner end of the valve cage will permit renewal of the seal in the inlet port without taking the entire valve structure apart and without regrinding any of the old or new parts.

I claim:

1. In a valve structure comprising a housing having at least one inlet port and an outlet port, a cylindrical valve plug rotatable in said housing, said plug being formed of a cylindrical side wall having a port therein for selective registry with said inlet port, said plug including an end wall at one end of said side wall, the other end of said plug being open and confronting said outlet port, and means for sealing said plug with respect to said inlet port, said means including a cylindrical member slidable in said inlet port, inwardly and outwardly projecting flanges at the inner end of said cylindrical member, a yieldable sealing element carried by said flanges and bearing against the periphery of said plug, a cylindrical sealing sleeve engaging about the outer side of said cylindrical member, and a spring within said cylindrical member bearing at its inner end against said inwardly projecting flange for constantly urging said cylindrical member inwardly.

2. A valve structure as set forth in claim 1 wherein said sealing element is triangular in transverse section with the apex contacting the periphery of said plug.

GEORGE T. DOWNEY.